3 Sheets—Sheet 1.

J. W. SCHUCKERS.

Assignor to THE CLYDE TYPE WRITER COMPANY.

TYPE WRITING MACHINE.

No. 11,156. Reissued Apr. 14, 1891.

Witness:
Geo. H. Botts.
C. J. Sawyer

Inventor
James W. Schuckers
by Philip Phelps Hung
Atty's.

3 Sheets—Sheet 2.

J. W. SCHUCKERS.

Assignor to THE CLYDE TYPE WRITER COMPANY.

TYPE WRITING MACHINE.

No. 11,156. Reissued Apr. 14, 1891.

Attest:
Geo. H. Botts.
C. J. Sawyer

Inventor:
James W. Schuckers
by Philipp Phipps & Hay
Attys.

3 Sheets—Sheet 3.

J. W. SCHUCKERS.

Assignor to THE CLYDE TYPE WRITER COMPANY.

TYPE WRITING MACHINE.

No. 11,156. Reissued Apr. 14, 1891.

Attest:
Geo. H. Potts.
C. J. Sawyer

Inventor:
Jacob W. Schuckers
by Philipp Phelps Hoey
Atty's

UNITED STATES PATENT OFFICE.

JACOBS W. SCHUCKERS, OF NEWARK, NEW JERSEY, ASSIGNOR TO THE CLYDE TYPE WRITER COMPANY, OF WEST VIRGINIA.

TYPE-WRITING MACHINE.

SPECIFICATION forming part of Reissued Letters Patent No. 11,156, dated April 14, 1891.

Original No. 433,097, dated July 29, 1890. Application for reissue filed December 26, 1890. Serial No. 375,896.

*To all whom it may concern:*

Be it known that I, JACOBS W. SCHUCKERS, of Newark, in the county of Essex and State of New Jersey, have invented an Improvement in Type-Writing Machines, of which the following is a specification.

This invention relates to that class of type-writers in which there are keys to be depressed successively by the action of a finger, and these keys move frames to turn the type-wheel a greater or less distance to bring the proper type in line for impression upon the paper, and by a continuation of the movement of the key the type is impressed upon the paper and the feed takes place between one impression and the next.

Figure 1:
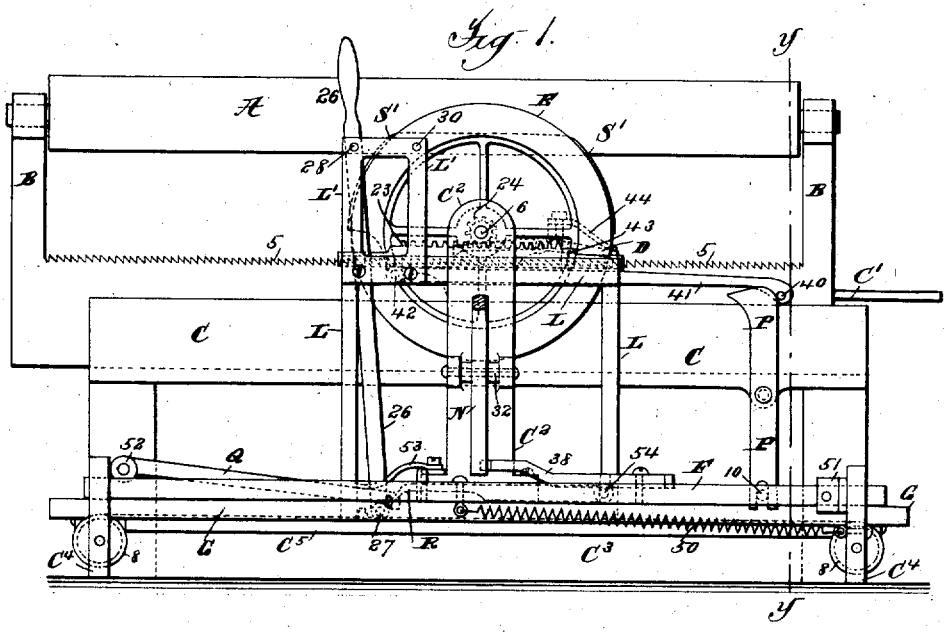
Figure 2:
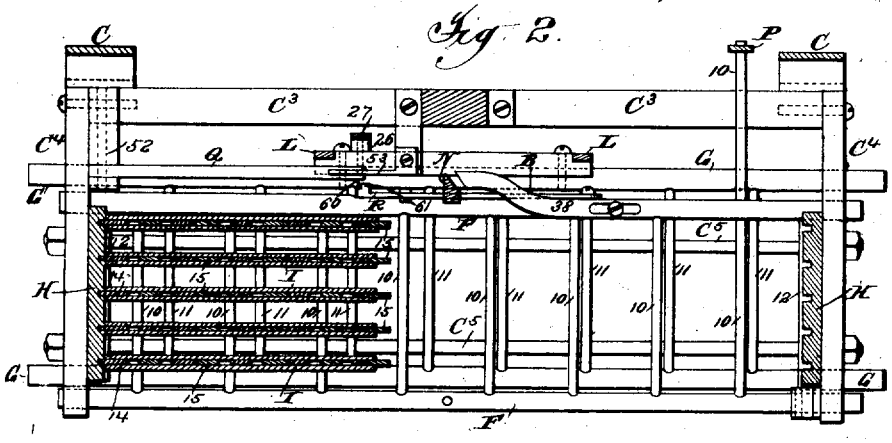
Figure 8:
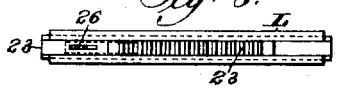
Figure 9:
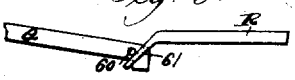
Figure 9:
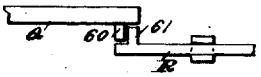
Figure 4:
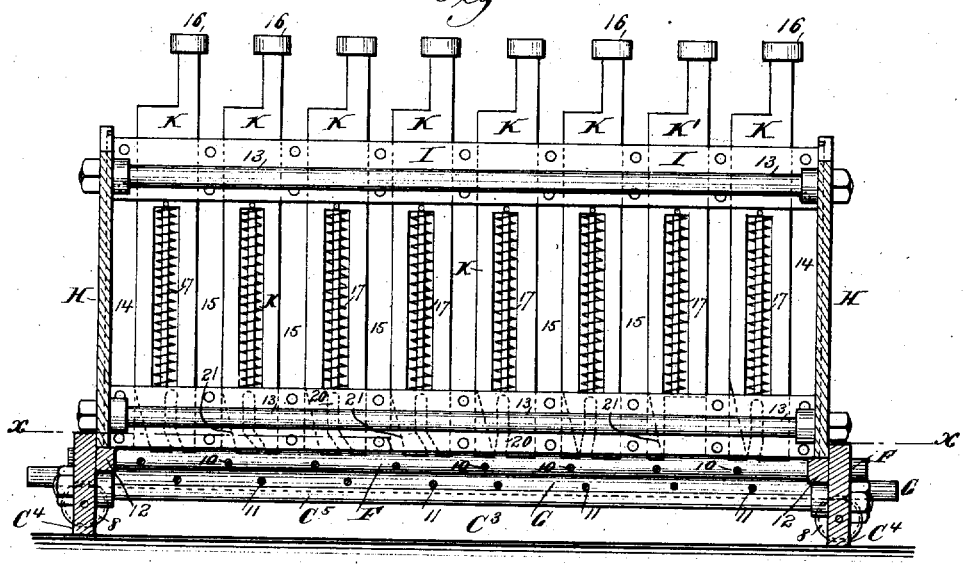
Figure 3:
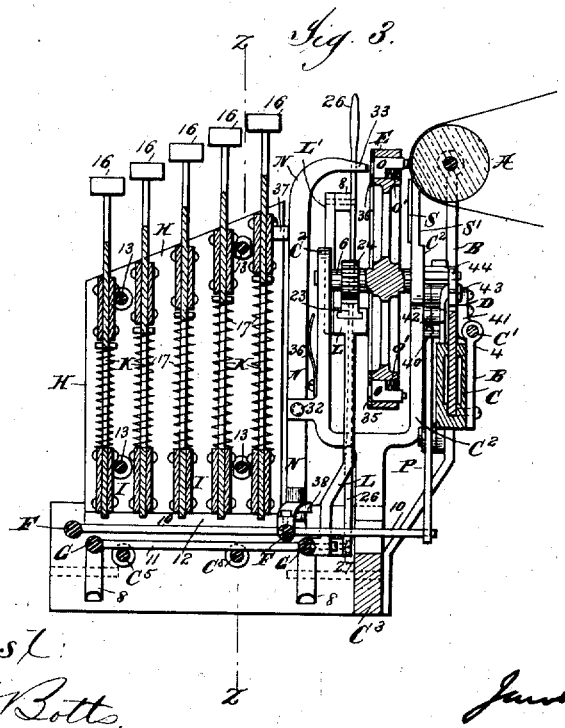
Figure 7:
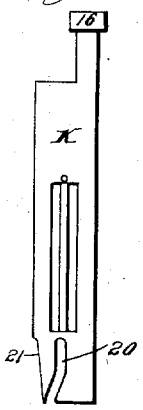
Figure 6:
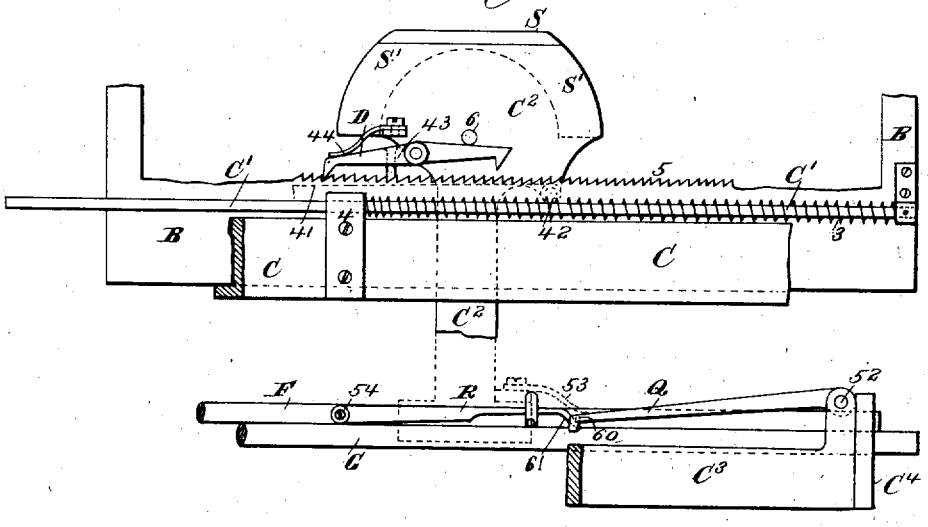
Figure 5:
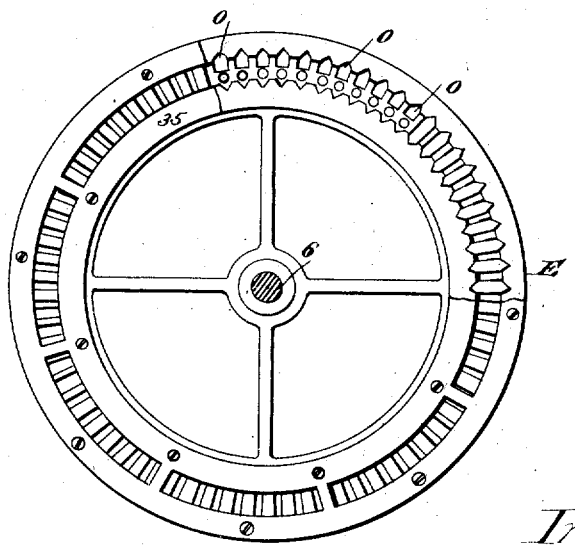

In the drawings, Figure 1 is an elevation with the ranges of keys and the frames carrying the same removed. Fig. 2 is a sectional plan view at or near the line *x x*, Fig. 4. Fig. 3 is a vertical section through the type-wheel and paper-roll, the other parts being in section near the line *y y*, Fig. 1. Fig. 4 is a section through the frame carrying the keys at the line *z z*, Fig. 3. Fig. 5 is an elevation of the type-wheel with a portion of the rear plate removed; and Fig. 6 is a rear view of the inking-pad and a portion of the frame for the paper-holding roll, showing also the spacing mechanism. Fig. 7 is a detached view of one key. Fig. 8 is a plan of the rack for moving the type-wheel, and Fig. 9 shows the ends of the detent and latch in plan and elevation.

The paper-carrying roll A is mounted in a frame B, to which a longitudinal movement is given for spacing the letters and the words as the writing progresses, and the guides for holding the paper around the roll A may be of any desired character such as is usual in type-writing machines.

The frame B is supported in a stationary guide-bar C, in which stationary guide-bar the frame is free to be moved endwise, and there is a rod C′ attached at one end to the frame B and sliding through a guide 4 upon the bar C, and around this rod C′ is an expansive spring 3, that tends to move the frame B and paper-carrying roll endwise whenever the latch D is lifted from the rack-teeth 5 upon the frame B. This latch D is acted upon by the mechanism hereinafter described, and each tooth 5 is of such size that the proper space will be allowed each movement for impressing the type, and the space between one word and another is made by lifting the latch D without impressing the type, a space-key being provided for that purpose.

The type-wheel E is upon an axis 6 in the frame $C^2$, and this frame $C^2$ and the stationary guide-bar C are connected to the bed-piece $C^3$, and there are side plates $C^4$, that rest upon the table or support and are connected at their back ends to the bed-piece $C^3$, and there are tie-rods $C^5$ connecting these plates $C^4$ firmly together. There are holes through these side plates $C^4$, in which the rods F F and G G slide freely, and it is preferable to introduce rollers 8 beneath the rods G G to lessen the friction and cause said rods to move endwise more easily. The rods F F are connected together by the cross wires or rods 10, and the rods G G are connected together by the cross wires or rods 11, so that these respective rods and cross-wires form two laterally-sliding frames, and one of which serves to control the feed of the paper and to give the impression of the types and the other to turn the type-wheel to the proper position, as more fully described hereinafter.

Above the side plates $C^4$ and resting upon the ledges 12 are end frames H, connected by tie-rods 13, and these end frames are grooved vertically upon their inner faces to receive the ranges of frames I, carrying the banks of keys. Each of these frames I is made of pairs of bars fastened together and to the end vertical bars 14, and there are vertical bars 15 between the top and bottom pairs of longitudinal bars, so that the key-plates K can pass in between the top and bottom pairs of bars in the ranges of frames I and between the bars 15, and such keys can be moved vertically with freedom, and at the upper end of each key is a finger-piece 16, having upon it the letter or character corresponding to the letter or character upon the type-wheel that will be impressed by the action of such key, and there is a spring 17 to each key to elevate the same, and this spring is preferably within a vertical slot in the plate forming the body of the key and around a central wire or bar within such slot, the bottom of the spring resting upon the top edges of the bottom pair of bars in the frame I, and the top of such spring bearing against the metal of the key-plate at the top of the slot. One of these keys is shown separately in Fig. 7, and each key has a cam-slot 20, that serves to bring the type-wheel to the proper position for the letter corresponding to the key to be impressed, as hereinafter described, and an incline 21 on one edge, that serves to feed the paper along the proper distance and to give the impression of the type against the paper. It is, however, to be understood that the space-key shown at K′, Fig. 4, will not have any slot in it to move the type-wheel, but only the incline 21 to feed the paper, and as the type-wheel is restored after each movement to a position where there is not any type to be impressed there will not be any character or letter printed when the space-key K is pressed down.

Upon reference to Fig. 4 it will be observed that each cam-slot 20 at its lower end is directly above one of the cross-wires 11 of the frame G, and these cam-slots are inclined more or less either to the right or left, as illustrated in Fig. 4, and the upper ends of these cam-slots 20 are vertical. The result of this is that the frame G is moved a greater or less distance either to the right or to the left by the depression of any one key K, and that movement is sufficient to partially rotate the type-wheel to the desired point, and this is effected by means of the frame L, that rises above the bars G and carries upon its upper surface a rack with teeth 23, that gear into the pinion 24 upon the arbor 6 of the type-wheel, so that as the frame of bars G, cross-wires 11, frame L, and rack 23 are moved by one of the cam-slots 20 the type-wheel E will be turned the required distance to bring the proper letter into line to be impressed.

In type-writing machines it is usual to have two sets of type, one large and the other small. Type-wheels of this character are well known, the types of one size occupying half of the circle and the other size occupying the other half of the circle. I provide for bringing one set of types into action and throwing the other set of types out of action by moving the rack-bar 23 endwise within the slot that is provided for it in the top bar of the frame L, and with this object in view I employ a lever 26, pivoted at 27 on the bar G and passing through a mortise in the rack-bar 23, and at the upper end of this lever 26 is a handle and a pin 28, and at one side of the frame L is an upward projecting frame L′ with two holes in it, so that when the pin 28 is in one of the holes, as shown in Fig. 1, the rack-bar will occupy such a position that one set of type will be employed, and if the lever 26 is moved so as to carry the rack 23 endwise and rotate the pinion 24 and type-wheel until the pin 28 passes into the holes 30 in frame L′ the type-wheel will have made a half-revolution and the second set of type be brought accurately into position for use. It is to be understood that the top bar of the frame L is slotted where the lever 26 passes through the same sufficiently to allow for the movement of the lever 26 from one position to the other.

The type-wheel that I prefer to use is made with a series of mortises parallel with the axis and arranged in a circle, as indicated in Fig. 5, each type being in a radial plane and guided at the outer and inner edges in V-grooves provided in said type-wheel, and the body of each type O is made L-shaped for a spring O′ to press the type back, so that the face of the type may be moved away from the paper, and there is an impression-lever N, pivoted at 32 and having a slightly tapering end 33, which is immediately behind the type that is vertically above the axis of the type-wheel, so that when this impression-lever is actuated the end 33 will press the type forward against the action of its spring O′ and give the impression upon the paper as such paper rests against the carrying-roll A. There is upon the back of the type-wheel E a ring 35 with segmental openings or slots to allow the end 33 of the impression-lever to pass through and act upon the type that may be in line with it; but this ring laps upon the V-shaped edges of the types at their bases sufficiently to prevent them being pushed too far backwardly by the action of the spring O′. The impression-lever N is thrown back by a spring 36, and the movement is arrested by a stop 37, so that such impression-lever has but a slight movement, and by reference to Figs. 1, 2, and 3 it will be seen that upon the rear rod F there is a finger 38 with an inclined end that comes into contact with the incline upon the lower end of the impression-lever N, and these parts come into contact after the type-wheel has been set in its proper position and during the end movement given to such rod F and the cross-bars 10 by the keys, as next described, so as to print the letter. The inclined edges 21 of the keys K come into contact with the cross-bars 10 and move them to carry the rods F endwise and feed the paper, as hereinafter described, and after doing so the inclined end of the finger 38 presses upon the lever N to print the letter or character, as before described. One of the cross-wires 10 is projected to the rear, as seen in Fig. 2, and the end passes into the slot upon the lower end of the cam-lever P, and the upper end of this cam-lever P acts upon a pin 40, that projects from the lever 41, the fulcrum of which is at 42, and there is a stud 43, Fig. 6, upon the latch D, which stud rests upon this lever 41, so that when the frame composed of the rods F and cross-wires 10 is moved by the contact of the inclined edge 21 of either key with one of such cross-wires 10 the cam-lever P is moved and the latch D raised to allow the spring 3 to move the frame B and roller A endwise one tooth upon the rack 5, and upon reference to Fig. 6 it will be seen that this latch D has two ends to it, so as to act like a watch-escapement and allow only one tooth at a time to pass by, and the spring 44 holds the latch in its normal position, and this feed takes place before the end of the finger 38 comes into contact with the impression-lever, and the upper end of the cam-lever P being nearly an arc of a circle the latch D is not lifted beyond the required amount and remains stationary during the impression of the type.

Upon reference to Fig. 4 it will be observed that the incline 21 on any one key commences to act against one of the cross-bars 10 slightly before the lower end of the cam-slot 20 reaches one of the cross-bars 11. Hence the frames composed of the rods F and cross-bars 10 and the rods G and cross-bars 11 are respectively moving at the same time, or nearly so, the one to bring into action the paper-feed and the other to turn the type-wheel around to the proper position, and the paper-feed ceases to act when the cam at the upper end of the lever P has raised the lever 41, and the movement of the type-wheel ceases when the vertical part of the cam-slot 20 is in contact with the cross-wire 11. Hence during the further downward movement of the key the inclined edge 21 in moving the wires 10 and rods F simply impresses the type by the action of the finger 38, as aforesaid. As the key which has been impressed rises, the spring 50, Fig. 1, draws the bars F and their cross-wires back to the normal position until the collar 51 stops against one of the end frames, and the cross-wires 11 and rods G are restored to their normal position in consequence of the lower ends of the cam-slots 20 being vertically in line with such wires 11; but in order to prevent the wires 11 and rods G receiving an end movement accidentally, and thereby not remaining in the proper position for the keys, I make use of the detent Q, that drops into the notch in the back rod G. This detent is pivoted at 52 and is pressed down by a light spring 53, and at one side of the detent Q a pin 60 projects, and there is a latch R pivoted at 54 on the back rod F, and the end of this latch is inclined at 61 to run under the pin 60 on the detent Q and lift the same, and the parts are to be so timed that incline 21 on either key gives motion to the rod F before the rods G and wires 11 are acted upon sufficiently for the latch R to lift up this detent Q and liberate the rods G and the cross-wires thereof, and this latch R being pivoted at 54 its incline 61 will pass freely above the pin on the detent Q during the return movement of the parts to their normal positions.

The types upon the type-wheel are to be inked in any ordinary manner. Usually it is only necessary to employ pads S upon the plate S′, that extend above the frame $C^2$, such pads being at each side of the type that is projected when the impression is made, and these pads S being of felt or similar material, and with their surfaces in line with the faces of the type, the ink is spread upon such types as the type-wheel is partially revolved, care being taken to prevent the pads causing friction upon the types to interfere with the movement of the type-wheel.

I do not limit myself to the particular type-wheel represented, as the keys, rods, cross-wires, and other moving parts can be used with a type-wheel of rubber or other known type wheel or segment.

The essential feature of that part of my invention relating to the positioning movement of the type-wheel consists in the use of a sliding frame operated directly from the keys by cam action, and in claiming a sliding frame and a series of keys engaging said frame by cam-surfaces I intend to cover a construction in which the part directly engaged by the keys has a sliding movement, as distinguished from the pivoted-frame construction long known in the art.

By the term "frame" used in the claims I mean and intend to cover any construction employing a plurality of bars, rods, or their equivalents, connected so as to move together, and each engaged by keys, thus permitting the latter to be arranged in rows corresponding to the different bars, so that a compact and convenient key-board may be formed; and the claims are not to be construed to cover a construction employing a single sliding bar, as such a construction forms no part of the subject-matter of this specification.

I claim as my invention—

1. The combination, with a type-wheel and impression and feeding mechanisms, of a sliding frame, connections between said frame and type-wheel for positioning the latter by the movements of the frame, and a series of keys engaging and actuating said frame by means of cam-surfaces, substantially as described.

2. The combination, with a type-wheel, of a sliding frame, connections between said frame and type-wheel for positioning the latter by the movements of the frame, a series of keys engaging and actuating said frame by means of cam-surfaces, and impression and feeding mechanisms operated by said keys, substantially as described.

3. The combination, with a type-wheel, of a sliding frame, connections between said frame and type-wheel for positioning the latter by the movements of the frame, a series of keys engaging said frame by means of cams having extended straight faces, whereby the frame is first actuated and then locked in position, and impression mechanism operated by the further movement of the keys after the type-wheel is positioned by the movement of the frame and while the type-wheel and frame are locked in position by the extended straight faces of the cams, substantially as described.

4. The combination, with a type-wheel and a pinion for rotating the same, of a sliding frame, a rack moving with said frame and meshing with said pinion, a series of keys engaging said frame by means of cams having extended straight faces, whereby the frame is first actuated and then locked in position, and impression mechanism operated by the further movement of the keys after the type-wheel is positioned by the movement of the frame and while the type-wheel and frame are locked in position by the extended straight faces of the cams, substantially as described.

5. The combination, with a type-wheel and paper-carrying mechanism, of the horizontally-moving frames composed of the rods F F and cross-wires 10, rods G G and cross-wires 11 for giving motion to the type-wheel and paper-feed, respectively, and the ranges of vertical keys having cams that act upon the respective cross-wires 10 and 11, substantially as set forth.

6. The combination, with a type-wheel and paper-carrying mechanism, of the ranges of keys K, the frames I for supporting the keys, the end frames H, connected together and receiving the frames I, the side plates $C^4$, with ledges upon which the end frames rest removably, and the rods and cross-wires upon which the keys act in giving motion to the type-wheel and paper-carrying mechanism, substantially as set forth.

7. The combination, with a type-wheel, of the impression-lever with one end adapted to press upon the type that may be in position, the ranges of keys, a frame formed of the rods F F and cross-wires 10, acted upon by such keys, and the finger 38 on one of the rods F for acting upon the impression-lever, substantially as set forth.

8. The combination, with ranges of keys, of the rods F, cross-wires 10, acted upon by such keys, the cam-lever P, receiving its motion from the rods F and wires 10, the lever 41, and latch D, therewith connected, the rack 5, frame B, and paper-carrying mechanism, substantially as set forth.

9. The combination, with a type-wheel having two sets of characters around its periphery, and a pinion and rack for moving the same, of the frame L, receiving the rack, and mechanism, substantially as specified, for sliding the rack and frame and revolving the type-wheel to bring the proper letter into position, and mechanism for moving the rack endwise in the frame to throw out of action one set of characters in the type-wheel and bring into position another set of characters, and means for holding the rack in position when adjusted, substantially as specified.

10. The combination, with the frames composed of the rods F and G and cross-wires 10 and 11, of the detent Q, the end of which passes into a notch in one of the rods G, a latch R, pivoted to the rod F for lifting such detent, and the ranges of keys acting upon the cross-wires 10 and 11, respectively, substantially as set forth.

Signed this 13th day of December, 1890.

JACOBS W. SCHUCKERS.

Witnesses:
T. H. PALMER,
C. J. SAWYER.